C. A. McMULLEN.
AUTOMATIC CHANGE MAKING MACHINE.
APPLICATION FILED DEC. 20, 1913.
1,228,459.
Patented June 5, 1917.
4 SHEETS—SHEET 1.
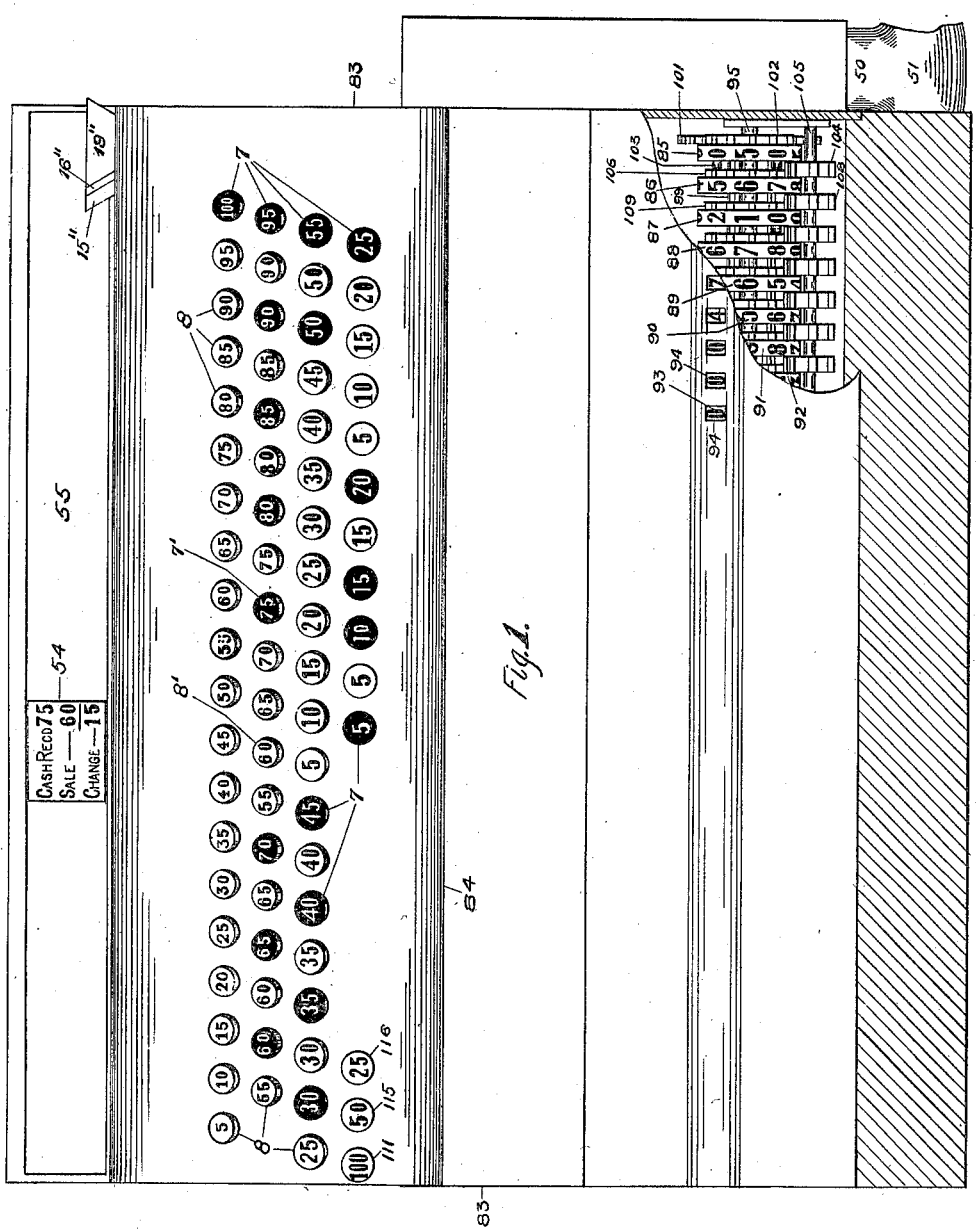

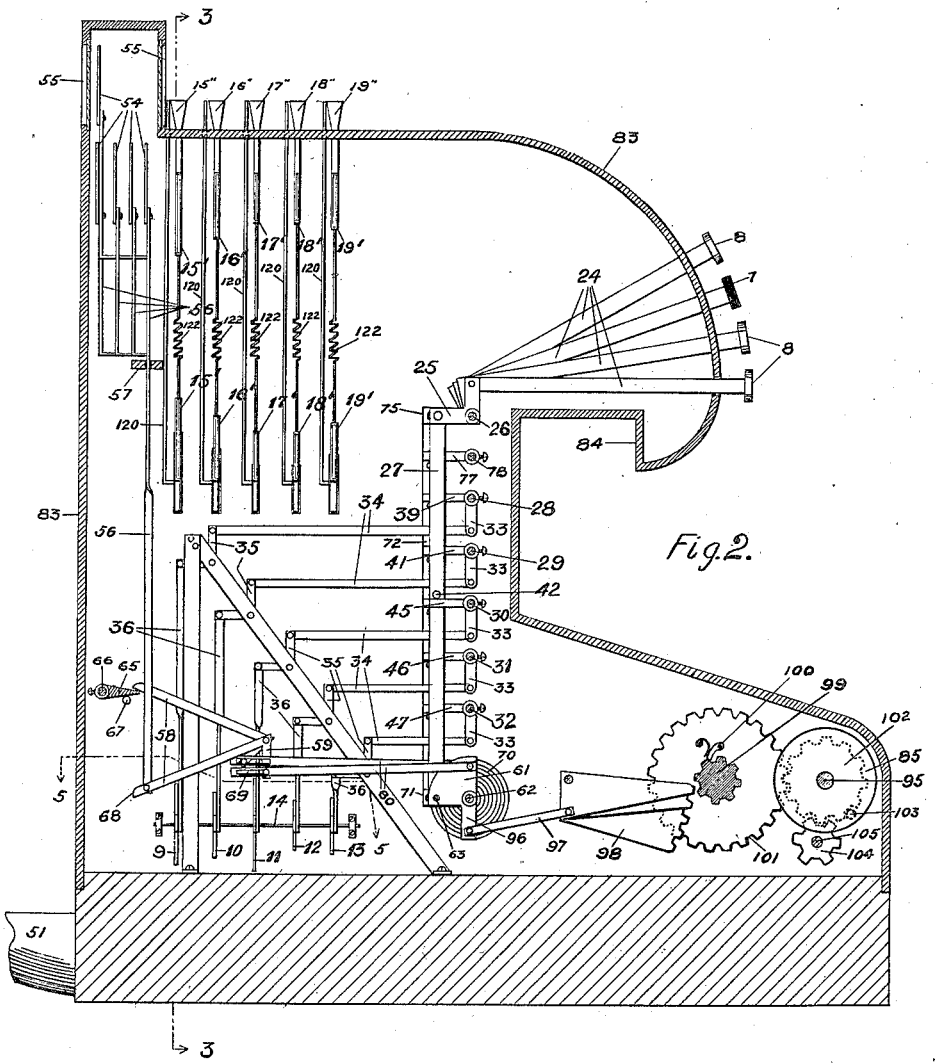

C. A. McMULLEN.
AUTOMATIC CHANGE MAKING MACHINE.
APPLICATION FILED DEC. 20, 1913.
1,228,459.
Patented June 5, 1917.
4 SHEETS—SHEET 3.
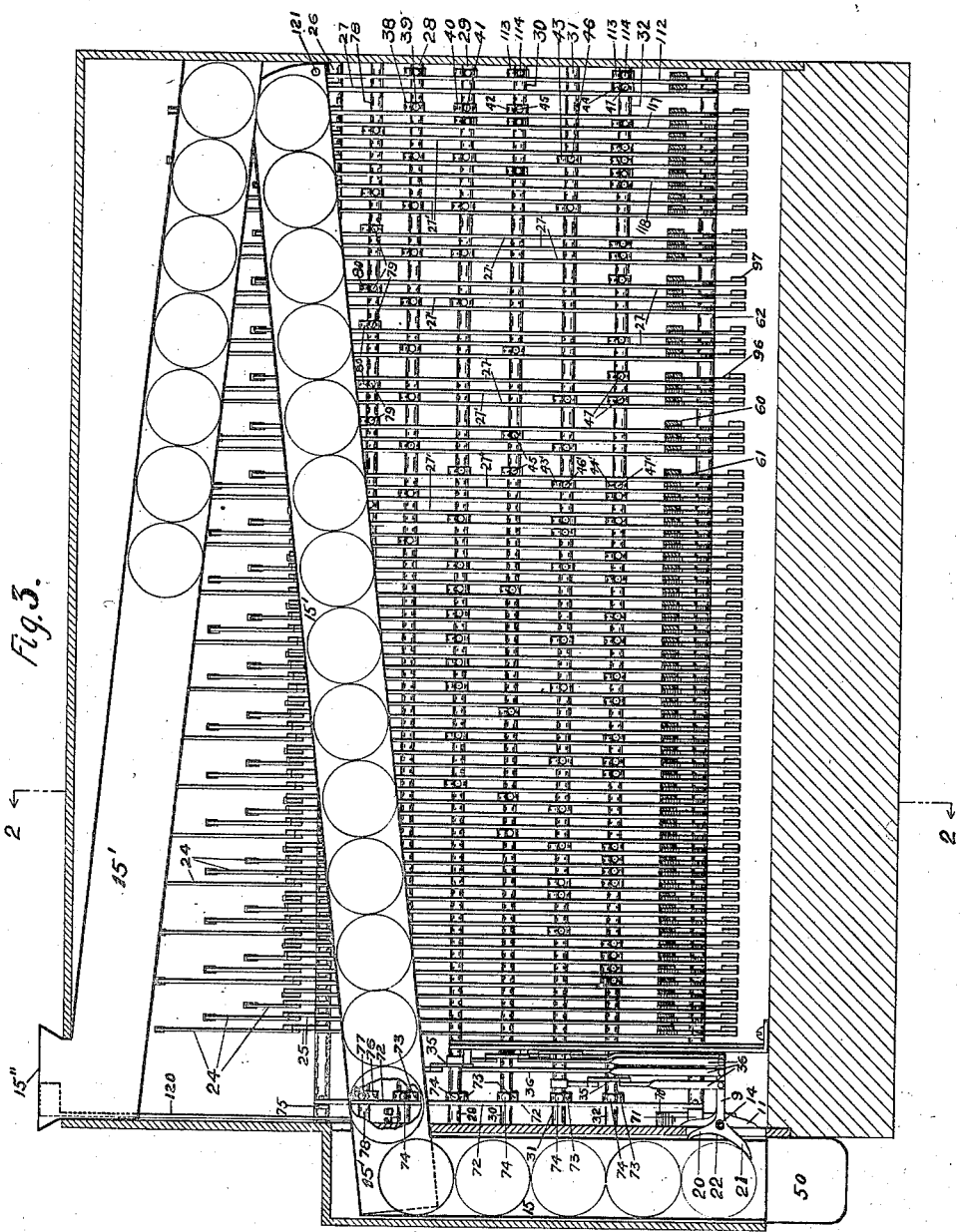

C. A. McMULLEN.
AUTOMATIC CHANGE MAKING MACHINE.
APPLICATION FILED DEC. 20, 1913.
1,228,459.
Patented June 5, 1917.
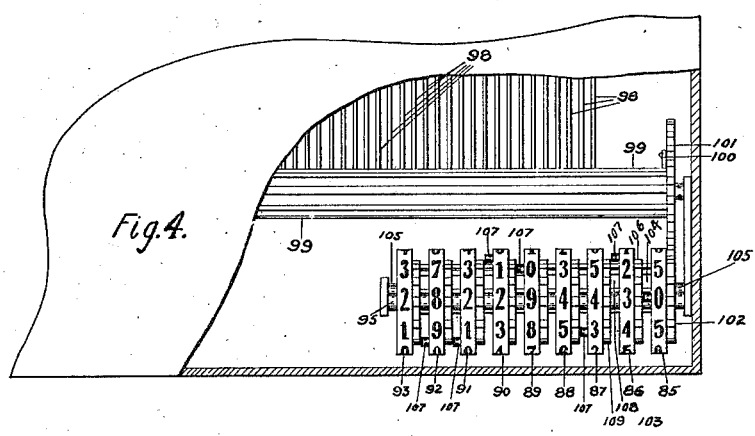
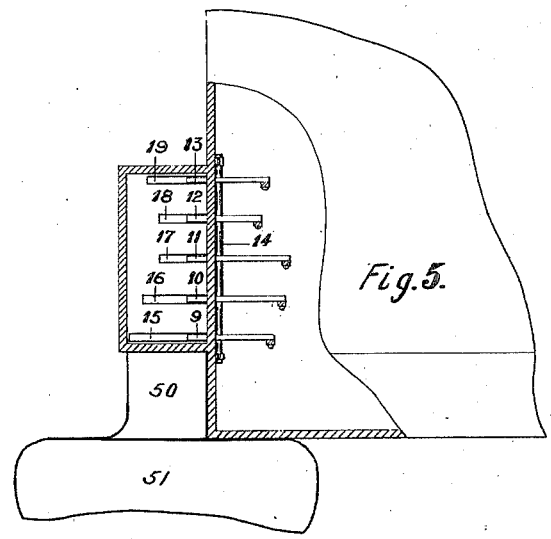

UNITED STATES PATENT OFFICE.

CHARLES A. McMULLEN, OF CALDWELL, NEW JERSEY.

AUTOMATIC CHANGE-MAKING MACHINE.

1,228,459.     Specification of Letters Patent.     Patented June 5, 1917.

Application filed December 20, 1913. Serial No. 807,860.

*To all whom it may concern:*

Be it known that I, CHARLES A. McMUL-LEN, a citizen of the United States, and resident of Caldwell, in the county of Essex and State of New Jersey, have invented a certain new and useful Automatic Change-Making Machine, of which the following is a specification.

The object of my invention is to eliminate the mental calculation ordinarily necessary in the act of "making change" between a given amount, say the amount of a sale, and an amount of greater value, say the amount which has been tendered in payment of that sale. In its broadest aspect, my invention contemplates the provision of a machine which will automatically deliver the exact amount in change between a given amount of any value and any other amount of greater value.

In its construction this machine embodies the combination of coin delivering devices, indicating devices having values indicative of the higher amounts, say for instance the amounts received, and change making keys possessing the lower values, representing say the amounts of the actual sales, which change making keys are disposed in certain distinguishing relation to the indicating devices and are arranged each when operated to actuate the change delivery device or devices necessary to deliver the change equal to the difference between the value of the change key operated and the value of the indicating device to which that particular key is related. The indicating devices representing the higher values of amounts received and the change making keys representing the relatively lower values of sale or actual expenditure, it is only necessary therefore upon receiving an amount in excess of the sale or actual value of the transaction, to operate the key which possesses that particular sale value and which is related to the indicating device which has a value corresponding to the value of the amount received, whereupon the coin delivery devices necessary to produce the desired amount of change will be actuated to deliver that change. In this way all mental calculation is eliminated and the clerk or operator merely has to select and operate the key of the value of the sale which is in distinguishing relation to the indicating device bearing the value of the amount received.

The relation between the sets of change making keys and the indicating devices to which the respective sets of keys belong, may be established in various ways. One way which I have illustrated in the present disclosure is to make the indicating devices in the form of keys and to place the change keys relating to a particular indicating key at one side of that key, the indicating keys being differentiated from the change keys, as by a difference in size, color or shape.

In addition to the above, my invention contemplates also the registering or recording of the work done by the machine. In the form of the invention illustrated, I have shown merely a register for totaling the amounts retained, but if desired, through the use of additional mechanism, a complete record may be kept as well of the amounts received and the change given. The change making keys are suitably connected to operate the registering mechanism each to the extent of its own particular value, and, for the purpose of keeping a true total of all the amounts received, including as well the amounts for which no change is needed, the indicating keys are also connected to operate the registering mechanism. Consequently when an amount is received for which no change is required, the indicating key of that particular value is operated and that amount is thereupon added to the previous total. The indicating devices therefore, in the present instance, perform a registering function in addition to their purely indicative or designating function.

Various other features of my invention will appear as the specification proceeds.

In the accompanying drawings I have illustrated a practical embodiment of the invention, but as this disclosure is purely illustrative, I would have it understood that various changes and modifications may be made without departing from the true scope and spirit of the invention.

Figure 1, is a front view of a machine constructed in accordance with and embodying the invention, this view illustrating more particularly the relation of the change making keys to the indicating keys. In this view the casing at the lower corner of the machine is broken away to show the construction of the registering mechanism.

Fig. 2, is a transverse sectional view of the machine, taken substantially on the plane of the line 2—2 of Fig. 3.

Fig. 3, is a longitudinal sectional view of the machine taken substantially on the plane of the line 3—3 of Fig. 2.

Fig. 4, is a broken plan view of the registering mechanism, the casing being broken away and shown in section.

Fig. 5, is a plan view of the coin delivery devices, this view being taken substantially on the plane of the line 5—5 in Fig. 2.

Considering the drawings now more in detail: The indicating devices, 7, in the machine illustrated, are in the form of push keys and will hereafter be referred to as the "indicating" or "no-change" keys. The number and the values of these keys will depend upon the capacity of the machine. The present machine is designed to deliver the change from any value from ten cents up to one dollar and the indicating keys accordingly range in value from ten cents up to one dollar. There is also provided for registering purposes, as will later appear, a five cents value no-change key. In machines of greater or less capacity than this, there will be a correspondingly greater or less number of these keys. The indicating keys represent amounts received, and for each indicating key there are change making keys representing all the different amounts for which the amount of that particular indicating key might be offered in payment. These change making keys are designated 8, and they are arranged in distinguishing relation to the indicating keys to which they relate by placing them at one side (to the left) of their respective indicating keys.

For convenience and for the purpose of producing a more or less symmetrical keyboard, the keys are banked in four horizontal rows. In the first row are placed the keys for making change between one dollar and any amount from five cents up to ninety-five cents. This row is accordingly made up of a series of sequentially arranged change making keys ranging in value from "5" cents up to "95" cents and all arranged to the one side of and therefore in distinguishing relation to the "100" or one dollar indicating key which is located at the end of the row.

At the end of the second row is the indicating key of "95" cents value and in distinguishing relation to that is the "90" cents change making key. Then in order, come the "90" cents indicating key with its related "85" cents change making key, the "85" cents indicating key with its "80" cents change making key, the "80" cents indicating key with its "75" cents change making key, the "75" cents indicating key with its related "70", "65", "60", and "55" cents change making keys, the "70" cents indicating key with its "65" cents change making key, the "65" cents indicating key with its "60" cents change making key, and the "60" cents indicating key with its "55" cents change making key.

The third row is made up of the "55" cents value indicating key with its related "50" cents change making key, the "50" cents indicating key with its related change making keys of "45", "40", "35", "30", "25", "20", "15", "10" and "5" cents values, the "45" cents indicating key with its "40" cents change making key, the "40" cents indicating key with its "35" cents change making key, the "35" cents indicating key with its "30" cents change making key, and the "30" cents indicating key with its "25" cents change making key.

In the fourth row there is located the "25" cents indicating key with its "20", "15", "10", and "5" cents value change making keys, the "20" cents indicating key with its "15" cents change making key, the "15" cents indicating key, the "10" cents indicating key with its "5" cents change making key, and the "5" cents indicating key.

The coin delivery devices which are operated by the change making keys, may be of any desired construction and in the present instance they take the form of dogs or trip members 9, 10, 11, 12 and 13, pivotally supported on a rod 14 and projecting into the fifty cents, twenty five cents, twenty cents, ten cents and five cents coin chutes 15, 16, 17, 18 and 19, respectively. As indicated most clearly in Figs. 3 and 5 each of these trip dogs is in the form of a yoke having upper and lower fingers 20 and 21, respectively, designed to alternately project in through an opening in the side of the coin chute as the dog is rocked on its pivot, and an intermediate hollow or pocket 22, to receive the coin (or coins in the case of the twenty cent trip dog).

The connections from the operating keys to the coin delivery devices may be of any type best suited to effect the necessary selective operation of the different delivery devices. In the machine illustrated, these connections are as follows: The stem or shank 24 of each change making key is connected at its inner end to the upright arm of a bell crank 25, which is supported on a pivot rod 26, and to the horizontal arm of this bell crank is connected an upright selector rod 27, which is arranged to operate one or more of the horizontal rock shafts 28, 29, 30, 31 and 32, each rock shaft being connected by a rocker arm 33, link 34, pivoted bell crank 35, and link 36, with one of the coin trips. The rock shafts 28, 29, 30, 31 and 32 thus serve respectively when actuated, to operate the fifty cents, twenty-five cents, twenty, ten and five cents coin trips. By operating different ones of these rock shafts therefore, the various requisite amounts of change may be delivered and to effect the selective operation of the several rock shafts, the selector rods carry pins or abutments to engage with outstanding arms on the different rock shafts. Thus certain of the selector rods carry pins 38, positioned to engage the outstanding arms 39, on the upper rock shaft 28, other selector rods carry pins 40, to engage outstanding arms 41 on the second rock shaft 29, while other selector rods carry pins 42, 43 and 44, to engage the outstanding arms 45, 46 and 47 on the rock shafts 30, 31 and 32, respectively.

To better understand the operation of the machine as thus far described, assume for example that the operator, a cashier for instance, has been tendered the sum of seventy-five cents, in the form of a half dollar and a quarter, in payment of a charge of sixty cents. The cashier then, noting the location of the indicating key of seventy-five cents value, simply pushes the change making key (8′) of sixty cents value which is in distinguishing relation to that particular indicating key (7′). The selector rod 27″, operated by this change making key, carries a pin 43′ to engage the outstanding arm 46′ on the rock shaft 31, and a pin 44′ to engage the arm 47′ on the rock shaft 32. Therefore upon the downward movement of this selector rod, the shafts 31 and 32 are rocked and as these shafts are connected to operate the ten and five cents coin trips respectively, the desired amount, fifteen cents in change is automatically delivered. The released coins may be caught in a trough 50, terminating in an open tray 51, from which the coins may be readily extracted, the tray being placed at the back of the machine or in some other position where it may be conveniently reached by the party to whom the change is due.

If, as a further example, the expenditure was twenty cents and the amount tendered in payment was one dollar, the change making key of twenty cents value which stands in distinguishing relation to the one dollar indicating key would be, operated, and, as the selector rod of that particular key carries pins to actuate the rock shafts (28, 29 and 32) controlling the fifty, twenty-five and five cents coin trips, the proper change, eighty cents, would be automatically delivered. If the expenditure was five cents and fifty cents was offered in payment, the five cents change making key which is in distinguishing relation to the fifty cents indicating key, would be operated, and, as the selector rod of that key carries pins to actuate the rock shafts (29 and 30) controlling the twenty-five and twenty cents coin trips, forty-five cents in change would be automatically delivered. In each case the simple act of operating the change making key of the expenditure value which is in distinguishing relation to the key having the value of the amount tendered, effects, through the selective operation of the various coin delivery devices, an automatic delivery of the correct change.

To provide for storage of a sufficient supply of coins in the machine, I have shown the coin chutes as having extensions 15′, 16′, 17′, 18′ and 19′, of zig-zag formation, extending from end to end of the machine and provided with entrance slots 15″, 16″, 17″, 18″ and 19″, through which the respective chutes are charged. The incline of these coin-storage extensions is sufficient to cause the coins to feed naturally by gravity.

A visual indication of each transaction is provided in the machine illustrated by means of indicator cards 54, one for each key, which, when the keys are operated, are projected up into view through the windows 55, in the top of the machine. Each card bears information concerning the operation effected by the key with which it is connected. Thus the card which appears in Fig. 1, is the one which is connected with the change making key 8′ and shows that the amount received was seventy-five cents, that the actual expenditure was sixty cents and that the change given was fifteen cents. The cards are mounted on rods 56, which are guided for vertical lifting movement in the bracket 57, each rod being connected at its lower end with the long arm 58, of an angle lever, the shorter arm 59, of which is connected by a link 60, with a rocker 61, on the restoring shaft 62. These rockers are directly operated by the selector rods, the rods being shown connected thereto at their lower ends by means of pivot pins 63. The movement of the selector rod, therefore, through the connections described, causes the indicator card pertaining to that particular selector rod to be projected up into view. Each indicator card preferably remains in view until the machine is next operated. To this end I have provided a support 65, hinged at 66, and normally resting against a stop 67. The ends of the long arms 58, of the angle levers are rounded off as at 68 so as to tilt the free end of the hinged support upward during the upward lifting movement of such lever. When tilted up far enough the support releases the arm which was previously supported by it, thereby allowing that particular card to drop down out of sight, and the support drops back into position to sustain the arm which has just raised it. A pin and slot or other lost-motion connection 69, is provided at some point in the line of connections to allow the indicator card to remain in its exposed position and permit the other parts to return to their normal positions.

A spring 70, is the means employed in the present instance for restoring the parts to normal position. This spring is coiled about the shaft 62, being anchored to the shaft or other fixed support at its inner end and connected at its outer end to the arm 71, pivoted on said shaft. To this spring actuated arm there is connected an upright restoring rod 72, having pins 73, engaging beneath rigid outstanding arms 74, on the several rock shafts 28, 29, 30, 31 and 32. The upper end of the restoring rod is guided in its movement by being connected to rocker arm 75 on the horizontal shaft 26. The restoring rod also carries a pin 76, engaging beneath a rigid outstanding arm 77, on the pivoted shaft 78. This shaft has a series of rigid arms 79, which are arranged to be engaged by pins 80, on the selector rods 27, of the no change or indicating keys. The operation of the change making keys effects a movement of one or more of the rock shafts 28, 29, etc., and the operation of a no change key effects a movement of the shaft 78, and as all these shafts are acted upon by the restoring spring (through the agency of the restoring rod and connections described), the said spring opposes the downward movement of the selector rods and therefore serves to return said rods and connected parts back to normal position as soon as pressure on the keys is released.

To facilitate operation of the keys, I have shown the front of the casing 83, of the machine, beneath the keyboard, provided with an undercut portion 84, forming a grip with which the fingers may be engaged while operating the keys with the thumb of the same hand.

The registering mechanism which forms a part of the machine illustrated, consists of a series of numbered disks 85, 86, 87, 88, 89, 90, 91, 92 and 93, the figures of which are visible through windows 94, in the front lower portion of the casing. These disks are rotatably supported on a shaft 95 and are operated through the following connections: Each of the rockers 61, has a downwardly extending arm 96, connected by a link 97, with a pivoted gear segment 98, which meshes with a pinion 99, said pinion being connected by a pawl 100 with a large gear 101, which is in mesh with a gear 102, fast to the first register disk 85. This first disk has the characters "0" and "5" arranged in alternation around its entire periphery and carries on the face opposite that to which the gear 102 is attached, a series of pins 103, equal in number to half the number of designations on the disk. As the disk is rotated to bring each alternate character into view, one of these pins meshes with a pinion 104, loose on shaft 105, and carries that pinion forward a distance of one tooth. Pinion 104 is in mesh with a gear 106, fast on the second register disk 86. This second disk and the succeeding disks are numbered from zero up to nine and each of them carries a pin 107. Upon each complete revolution of the second disk, the pin 107 which it carries, meshes with a pinion 108 on shaft 105, and advances that pinion one tooth. This pinion is in mesh with a gear 109 on the back of the third register disk. By successive sets of intermeshing pinions and gears, and with the aid of the pins 107, a complete rotation of one register disk serves to advance the next disk one step.

In order to impart a movement to the register disks proportionate to the value of the key operated, the gear segments actuated by the respective keys, are provided with a number of teeth necessary to give the requisite proportionate movement to the register disks, substantially as indicated in Fig. 2.

To illustrate the operation of the registering mechanism, let it be supposed that all the register disks stand at zero and that a five cent piece has been received in payment of an expenditure of five cents. The no change key of five cents value is thereupon operated and as the gear segment which is actuated by this key is of sufficient extent to only advance the first register disk one step, said disk is turned just far enough to cause the numeral "5" to appear in the first window opening 94. As the parts are restored to normal position by the restoring spring, the gear segment drops back into its lowered position, the pawl 100 permitting backward rotation of pinion 99 at this time without disturbing the position of the gears and register disks. If the expenditure had been ten cents and a twenty-five cent piece had been received in payment thereof, the ten cents value change making key which is in distinguishing relation to the indicating or no change key of twenty-five cents value would be operated, and this, in addition to effecting the delivery of the fifteen cents in change, would cause the actuation of the gear segment which is connected with that key. This gear segment has teeth sufficient to turn the first register disk a distance of two spaces, which would cause the first disk to register zero and one of the pins 103 on this disk, engaging pinion 104, would at the same time cause this pinion to advance the second register disk one step, thereby causing this second disk to register "1", the two disks together thus registering ten cents. As further examples, if the amount retained were forty-five cents, the first register disk would be advanced nine steps, leaving that disk registering "5", and four of the pins 103, having by this movement been engaged with pinion 104, would cause the second register disk to register "4", making a showing of "45" cents; if then an additional payment of sixty cents were received, the first disk would be advanced twelve steps, leaving that disk registering "5", six of the pins 103 having engaged and operated pinion 104, would have caused the second disk to be advanced six additional steps, making one complete revolution (ten steps) for that disk, leaving it registering "0", and the one complete revolution of the second disk will have caused the pin 107 on said disk, through the medium of pinion 108 meshing with gear 109, to have advanced the third disk one step, causing that disk to register "1", the three disks thus registering the correct total of one dollar, five cents.

In the machine illustrated, provision is also made for simply delivering various amounts of change, at will. Thus the key 111, (marked "100") operates a selector rod 112, carrying pins 113, to engage outstanding arms 114 on the rock shafts 28, 29, 30 and 32, which are connected respectively with the fifty, twenty-five, twenty, and five cents coin trips. The operation of this key therefore effects the delivery of one dollar in change. Two other keys 115 and 116, are shown, (marked "50" and "25"), which, by their selector rods 117 and 118, respectively, operate the rock shafts connected with the coin strips necessary for delivering the amounts of fifty and twenty-five cents in change. Other keys of this purely money-changing character could be added if desired.

In order that the operator may know at once when any of the coin chutes need recharging, I have shown the machine equipped with so-called "replenishing" indicators 120, these indicators being connected to the lower or free ends of the movable coin holders or extensions 15', 16', etc., which at their upper ends are pivoted at 121. The weight of the coins serves to depress the coin holders against the tension of the supporting springs 122. As the coin holders become empty or nearly empty of coins, these counterbalancing springs lift the free ends of the coin holders and the indicators are thus projected into view through slots in the top of the casing.

What I claim is:

1. An automatic change making machine, comprising in combination, change delivery devices, indicating devices possessing values representing amounts received, a plurality of change making devices distinguishably associated with each indicating device, possessing values less than the value of the indicating device with which they are associated and representing amounts for the payment of which the amount of that particular indicating device might be tendered and operating connections from the change making devices to the change delivery devices necessary to deliver the change between the values of the respective indicating devices and the values of the change making devices which are distinguishably associated with the respective indicating devices.

2. An automatic change making machine, comprising in combination, change delivery devices, indicating keys having values representative of amounts received, change making keys grouped in distinguishing relation to the respective indicating keys and having values less than the values of the indicating keys with which they are grouped, and operating connections from different change making keys to the change delivery devices necessary to deliver the difference in change between the values of the respective indicating keys and the values of the change making keys in grouped relation to the respective indicating keys.

3. An automatic change making machine, comprising in combination, registering mechanism, indicating keys of different values representative of various amounts received and arranged each when operated to actuate the registering mechanism to the extent of its value, change making keys distinguishably related to the indicating keys, of less value than the indicating keys and arranged when operated to actuate the registering mechanism to the extent of their respective values, change delivery devices and operating connections from the change making keys to the change delivery devices necessary to deliver the change between the values of the change making keys and the values of the indicating keys with which the respective change making keys are distinguishably associated.

4. An automatic change making machine, comprising, indicating keys of graduated value, change making keys grouped in distinguishing relation to individual indicating keys and possessing values related to the values of the indicating keys with which they are grouped, change delivery devices and operating connections from the change making keys to the change delivery devices necessary to deliver the change between the values of the change making keys and the values of the indicating keys with which the said change making keys are grouped.

5. An automatic change making machine, comprising, indicating keys of graduated value, change making keys grouped in distinguishing relation to individual indicating keys and possessing values related to the values of the indicating keys with which they are grouped, change delivery devices, operating connections from the change making keys to the change delivery devices necessary to deliver the change between the values of the change making keys and the values of the indicating keys with which the said change making keys are grouped and indicator cards operatively connected with the change making keys and bearing indicia of the change making transactions accomplished by the keys with which they are connected.

6. In an automatic change making machine, coin delivery devices, a rock shaft connected with each coin delivery device, rocker arms on said rock shafts, key-operated selector rods, abutments on the selector rods engaging certain of said rocker arms for selectively operating the respective rock shafts, a restoring spring and one-way connections from the respective rock shafts to said restoring spring whereby operation of any of said rock shafts will place said restoring spring under tension.

Signed at New York city in the county of New York and State of New York this 12th day of December A. D. 1913.

CHARLES A. McMULLEN.

Witnesses:
PHILIP S. McLEAN,
CELIA L. BROOKS.